US007121508B2

(12) United States Patent
Fulcher et al.

(10) Patent No.: US 7,121,508 B2
(45) Date of Patent: *Oct. 17, 2006

(54) AIRCRAFT WHEEL IMMOBILIZER

(75) Inventors: Robert A. Fulcher, Grand Junction, CO (US); Allan E. Beavers, Grand Junction, CO (US)

(73) Assignee: MITI Manufacturing Company, Grand Junction, CO (US)

( * ) Notice: Subject to any disclaimer, the term of this patent is extended or adjusted under 35 U.S.C. 154(b) by 4 days.

This patent is subject to a terminal disclaimer.

(21) Appl. No.: 11/037,748

(22) Filed: Jan. 17, 2005

(65) Prior Publication Data

US 2005/0178902 A1 Aug. 18, 2005

Related U.S. Application Data

(63) Continuation-in-part of application No. 10/728,581, filed on Dec. 4, 2003, now Pat. No. 6,896,223.

(60) Provisional application No. 60/431,187, filed on Dec. 4, 2002.

(51) Int. Cl.
B64C 25/42 (2006.01)

(52) U.S. Cl. ............... 244/111; 70/226; 70/228; 188/32

(58) Field of Classification Search ........... 244/111; 70/225, 226, 228, 259, 260; 188/32
See application file for complete search history.

(56) References Cited

U.S. PATENT DOCUMENTS

| 1,370,364 | A | 3/1921 | Rodriquez |
| 1,376,114 | A | 4/1921 | Raney |
| 2,418,279 | A | 4/1947 | Sax et al. |
| 2,442,501 | A | 6/1948 | Mast et al. |
| 2,822,063 | A | 2/1958 | Hampton |
| RE24,712 | E | 10/1959 | Marugg |
| 2,960,857 | A | 11/1960 | Winter |
| 3,537,548 | A | 11/1970 | Jeppesen |
| 3,581,846 | A | 6/1971 | Janus |
| 3,695,071 | A | 10/1972 | West |
| 3,760,620 | A | 9/1973 | Robles |
| 3,828,590 | A | 8/1974 | Thiebault |
| 3,845,643 | A | 11/1974 | Barrett |
| D275,073 | S | 8/1984 | Winter |
| 4,649,724 | A | 3/1987 | Raine |
| 4,723,426 | A | 2/1988 | Beaudoin |
| 4,804,070 | A | 2/1989 | Bohler |
| 4,819,462 | A | 4/1989 | Apsell |
| 4,833,442 | A | 5/1989 | Von Heck |
| 5,040,389 | A | 8/1991 | Beaudoin |
| 5,134,868 | A | 8/1992 | Bethards |
| 5,263,553 | A | 11/1993 | Duncan |
| 5,315,848 | A | 5/1994 | Beyer |

(Continued)

FOREIGN PATENT DOCUMENTS

AT 227102 4/1963

(Continued)

OTHER PUBLICATIONS

Office Action from the UK Patent Office dated Aug. 19, 2005. 2 Pages.

*Primary Examiner*—J. Woodrow Eldred
(74) *Attorney, Agent, or Firm*—Sheridan Ross P.C.

(57) ABSTRACT

The present invention is adapted to immobilize a vehicle by utilizing a pair of selectively interconnected chocks that are placed fore and aft of a tire. The chocks are preferably used to secure aircraft and/or aircraft ground support equipment from unauthorized motion in airport parking areas.

20 Claims, 13 Drawing Sheets

U.S. PATENT DOCUMENTS

| | | |
|---|---|---|
| 5,333,477 A | 8/1994 | Davis |
| 5,372,018 A | 12/1994 | Smith |
| 5,375,442 A | 12/1994 | Hammer |
| 5,385,038 A | 1/1995 | Walker |
| 5,427,210 A | 6/1995 | Willaford |
| D385,525 S | 10/1997 | Beavers et al. |
| D385,526 S | 10/1997 | Hinkle |
| 5,689,981 A | 11/1997 | DeLuca et al. |
| 5,865,048 A | 2/1999 | Beavers et al. |
| 6,032,497 A | 3/2000 | Fulcher et al. |
| 6,116,062 A | 9/2000 | Markegard et al. |
| 6,725,979 B1 | 4/2004 | Snook |
| 2004/0045774 A1 | 3/2004 | D'Alessio |

FOREIGN PATENT DOCUMENTS

| | | |
|---|---|---|
| GB | 2112725 | 7/1983 |
| GB | 2 128 949 | 5/1984 |
| NO | 93730 | 2/1959 |

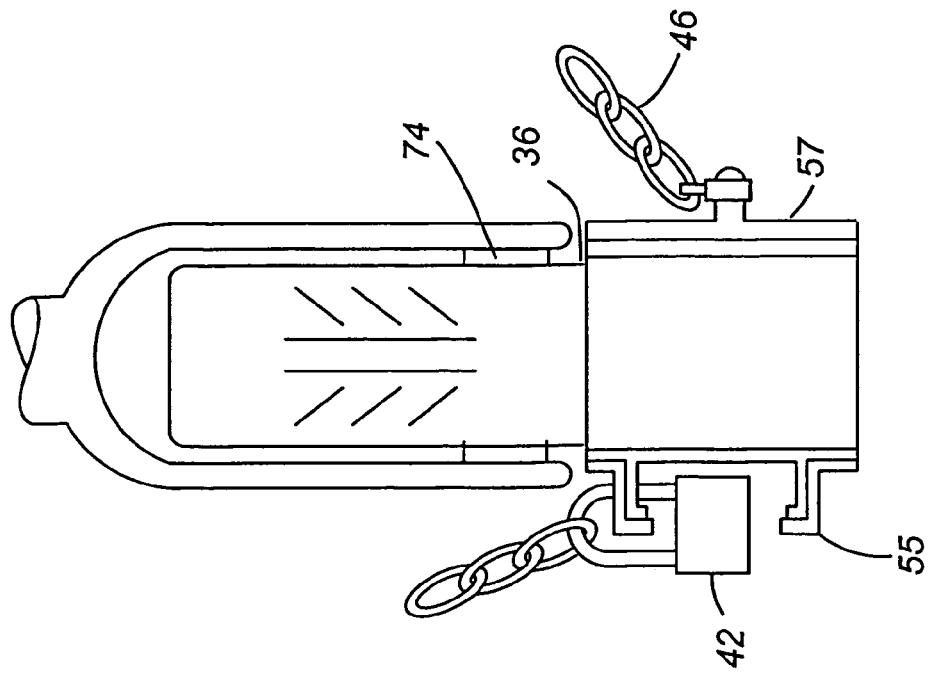
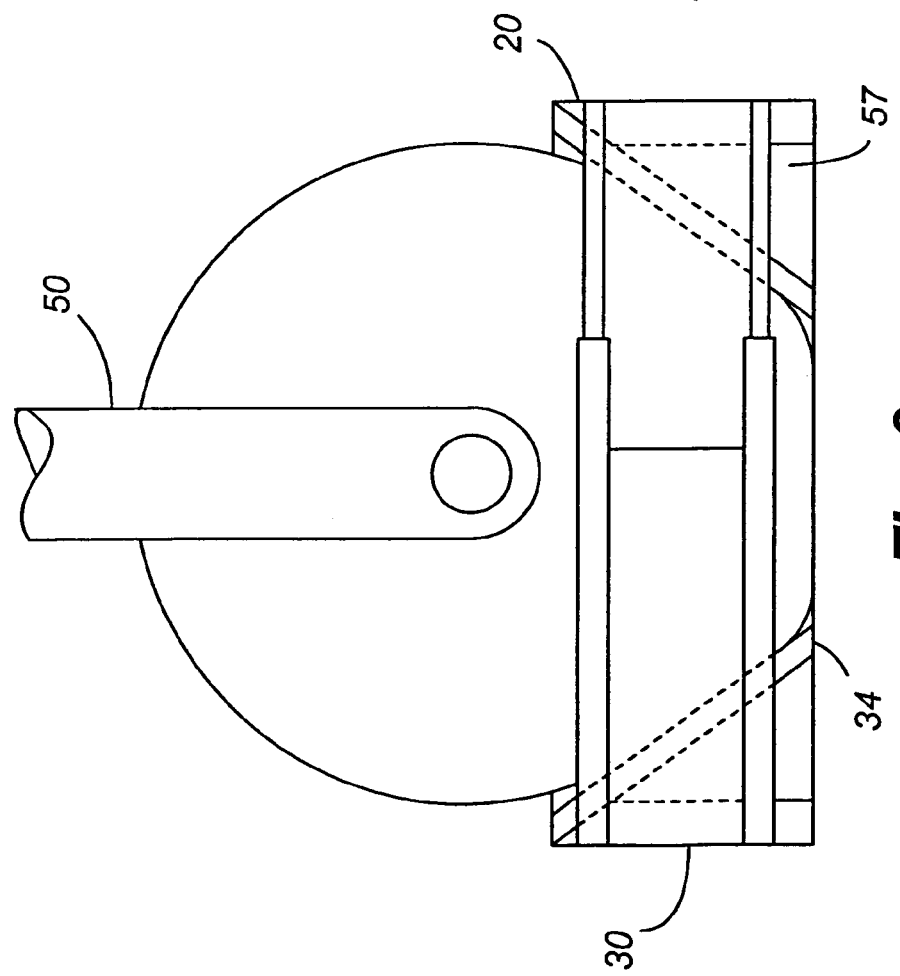

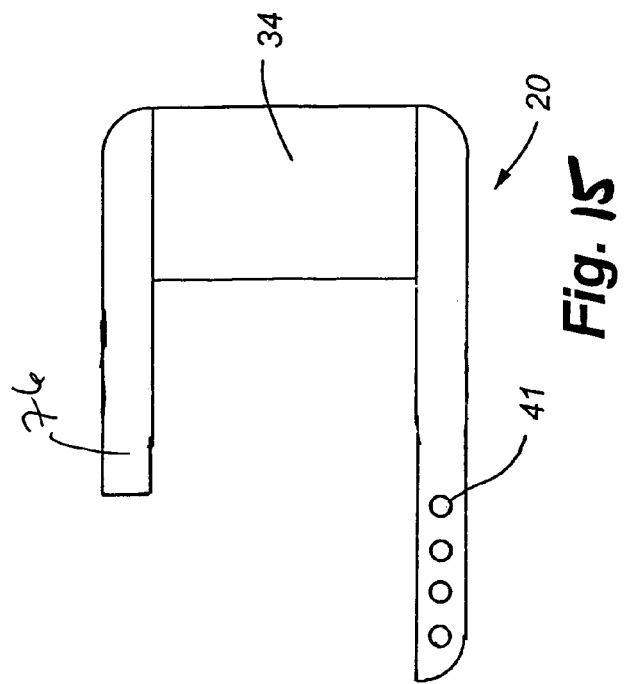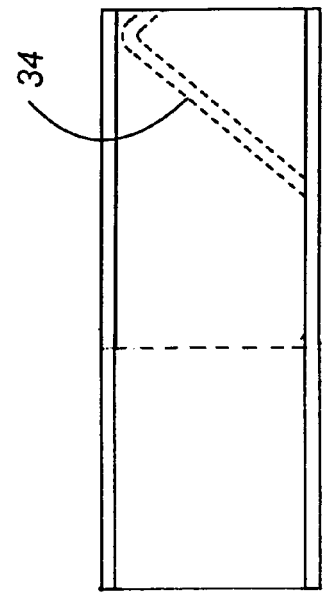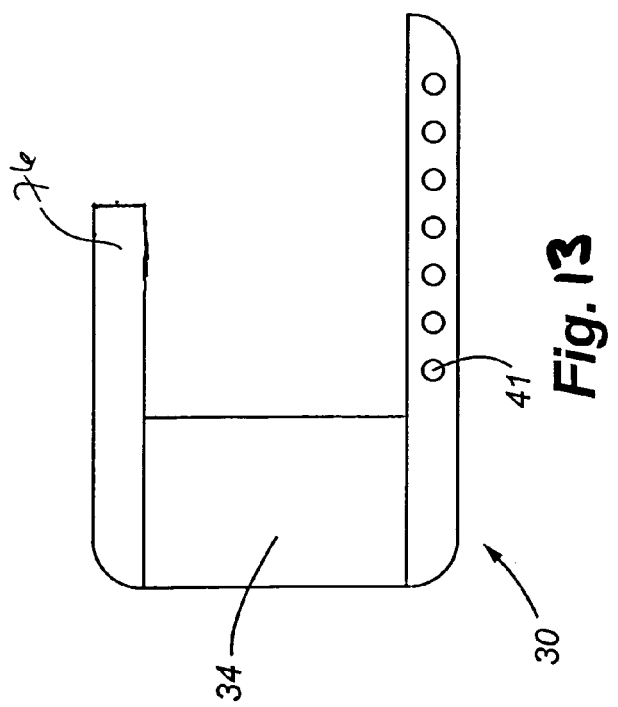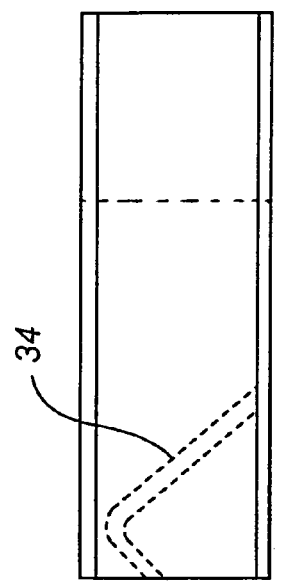

AIRCRAFT WHEEL IMMOBILIZER

This application is a Continuation-In-Part of U.S. patent application Ser. No. 10/728,581, filed Dec. 4, 2003 now U.S. Pat. No. 6,896,223, which claims the benefit of U.S. Provisional Patent Application Ser. No. 60/431,187, filed Dec. 4, 2002, both applications incorporated by reference in their entirety herein.

FIELD OF THE INVENTION

The present invention relates to devices for selective interconnection to a tire of a vehicle, and more specifically to light-weight chocks used to generally prevent and deter theft and unauthorized movement of aircraft and associated ground support equipment.

BACKGROUND OF THE INVENTION

Wheel immobilization devices are employed in a variety of situations, most commonly being the wheel chock. Wheel chocks provide an easy and inexpensive way to ensure that a vehicle will remain at rest if a parking brake should fail. Often chocks will have a triangular or rectangular cross section, the former being the preferred shape because it approximates the shape of a tire and thus provides a greater assurance of immobility. Wheel chocks are frequently used to restrain large trucks, mobile support equipment, or in the case of the present invention, aircraft, aircraft tugs, luggage tugs, aircraft stairs, fuel trucks and similar ground support equipment.

It is common practice at most airports to provide chocks and/or tie-down means at aircraft parking and staging areas to prevent aircraft from rolling due to uneven pavement surfaces or wind impingements. More specifically, chocks prevent horizontal motion, while tie-downs generally prevent vertical motion, for example lift generated by high ground winds. Thus, chocks and tie downs provide sufficient immobilization for small aircraft. Larger aircraft generally do not require tie downs since ground winds have a reduced effect thereon, due to their increased weight. Tie-downs also may be capable of providing sufficient rolling impedance for smaller aircraft if chocks are not available.

After the Sep. 11, 2001 terrorist attacks on the United States, it became painfully evident that America's aircraft and airports are in need of greater security measures. One area that requires more security are airports that serve private pilots and business jets. Even though security has been increased as a result of the terrorist attacks, there are still gaping holes that may allow a terrorist with the proper skills to steal an aircraft and reek havoc. Moreover, many small airports are not continuously monitored and are not protected by fences or walls, nor do they have hangars for aircraft housing. A would-be terrorist could easily gain access to the aircraft parking area, remove the chocks and tie-down chains, gain access to an aircraft, "hot-wire" the ignition, and take off. Since many single engine aircraft are light weight and have low wing loading, a runway take off may not be necessary, such that a taxiway would suffice to enable the aircraft to become airborne. Thus, an aircraft could be in the air before ground or tower controllers realize that the aircraft had been stolen. Even though one small single-engine aircraft may not do much damage, many coordinated aircraft would do great damage to a building, sports venue, or other structure.

An aircraft may be locked via the tie-down means. Chain or cable tie-downs, which interconnect wing attachment points to the ground, may be integrated with locks in order to prevent unauthorized movement of an aircraft. Unfortunately, many of these types of tie-downs are prone to rust and are easily cut. Alternatively, the attachment hardware on the aircraft could be removed. Finally, many small airports employ rope tie-downs which provide no protection against theft.

Propeller locks are another means of preventing unauthorized use of an aircraft. However, propeller locks may be undesirable to employ because generally they are heavy, cumbersome, difficult to install and remove, and are apt to damage the propeller during installation and removal. In addition, propeller locks only prevent movement of the propeller, the wheels of an aircraft utilizing such a lock may be moved, wherein the aircraft may be stolen. Finally, propeller locks are useless in conjunction with jet aircraft.

There are many wheel locking devices in the prior art. For example, United Kingdom patent No. 2,112,725 to Milner et al. (hereinafter "Milner") describes a wheel locking device that comprises a forward chock and a rear chock that are slidingly interconnected. The drawback of Milner is that an inner chock member which is located adjacent to the internal surface of the wheel, will possibly interface with internal components of the vehicle wheel and interconnection of the inner chock members is difficult.

In addition, U.S. Pat. No. 3,695,071 to West (hereinafter "West") and U.S. Pat. No. 5,427,210 to Willaford (hereinafter "Willaford") each discloses a wheel interconnection system that includes inner wheel contact members that prevent transverse disengagement of the chock. However, one drawback of West is that the device must be physically interconnected to the wheel, which is often difficult to perform, especially when the parking area is cold, snowy and/or wet.

U.S. Pat. No. D385,526 to Hinkle (hereinafter "Hinkle") shows a wheel locking device comprising two chocks that are interconnected with a sliding member. The drawback of Hinkle is that it does not include a member that engages the inner surface of the wheel, so the interconnected system may be easy moved transversely and disengaged from the wheel.

The foregoing is mainly concerned with small private aircraft, but theft can foreseeably occur with respect to larger aircraft or other types of vehicles, although the sophistication of a thief or terrorist may necessarily be greater. Theft of business or jumbo jets may foreseeably occur, which are capable of causing great damage. Further, as was the case in the Oklahoma City bombing, trucks have been used in the past as weapons of terror. Finally, wheel immobilization devices are useful in immobilizing aircraft ground support equipment. More specifically, aircraft tugs, baggage tugs, fuel trucks, aircraft stairs, food trucks, etc. are used in close proximity to aircraft at many airports. These vehicles could be used to damage aircraft and other equipment, to injure ground support personnel, and to damage property in or around the aircraft servicing areas of airports. In addition, fuel trucks may be stolen and used for terrorist purposes.

Thus, there is a long felt need in the field of wheel immobilization to provide an apparatus that is capable of locking interconnection with a vehicle to prevent theft while ensuring vehicle immobility. More specifically, it has been an urgent need to provide a means to secure parked aircraft and aircraft ground support equipment so that they do not become tools for terrorists, vandals or thieves. The following disclosure describes a locking chock that is adapted to immobilize various types of aircraft ground support equipment.

SUMMARY OF THE INVENTION

It is one aspect of the present invention to provide an apparatus that not only prevents a vehicle from moving, but also is capable of being locked to prevent unauthorized removal thereof. More specifically, one embodiment of the present invention includes a two piece chock system wherein one piece is situated in front of a vehicle's tires, while the other is situated behind the tire. The two pieces are designed for simplistic adjustment, wherein the device may be employed on vehicles with tires of various diameters.

It is another aspect of the present invention to provide an apparatus that is cost effective to manufacture, and utilizes common materials. Due to the heightened risk of terrorism, it is envisioned that locking devices as described herein will be encouraged or lawfully required by statute to be used in the near future. More specifically, it is foreseeable that fixed base operators that service corporate and private aircraft of any size will be increasingly held to the high security standards of commercial operators. Therefore, to make any transition as cost effective as possible, one embodiment of the present invention is designed to be manufactured from common materials. Preferably, the chocks are constructed of aluminum, steel, or any other rigid materials known in the art. Alternatively, the chock may be constructed with formed composite, durable plastic, or polycarbonate materials. By using common materials and machining techniques, the chock halves will also be easy to maintain or repair if damaged.

It is yet another aspect of the present invention to provide an apparatus that is simplistic to use. A locking chock that is difficult to install will inevitably not be employed with great frequency, unless mandated by law. Therefore, in one embodiment of the present invention the locking halves of the chock are light-weight and may be installed by a single person. To ensure an aircraft is properly secured at the termination of a flight, chocks are often carried onboard in the event the airport is not equipped with extra chocks. Heavy chocks will decrease the effective payload of an aircraft, which may be a detriment when flying a smaller aircraft. Light chocks, however, are easy to manipulate into interconnection with a tire, thereby eliminating excuses of tired pilots related to the installation of the device. Moreover, one-person installation is important in the event of a solo flight where no ground personnel are available to aid in securing an aircraft.

It is still yet another aspect of the present invention to provide an apparatus that is adapted for many sizes of aircraft. As previously mentioned, any size of aircraft is capable of being stolen, therefore various sized and shaped locking chocks are required. In one embodiment of the present invention, inclined surfaces are integrated into a chock, wherein it is capable of wedging between the aircraft's tire and the ground. A second, similarly designed chock will then wedged between the tire and the ground opposite of the first and be secured thereto. By interconnecting the two chock halves in a telescoping manner, a plurality of tire diameters are accommodated. The aforementioned inclined surfaces may also be adapted to contract and expand to accommodate a plurality of tire widths. An embodiment employing one or both of these adjustment means will allow airports to have extra sets of chocks to accommodate various types of wheels of incoming aircraft.

It is yet another aspect of the present invention to provide a chock that prevents disengagement by vertical wheel displacement. Some un-chained chocks may be forcibly disengaged from an aircraft by lifting the wheel and sliding the chock away. This method of disengagement is most readily seen in the context of light aircraft, wherein very little upward force is required to provide sufficient clearance for an un-chained chock to be removed. Therefore, one embodiment of the present invention is equipped with vertical extensions that maintain interconnection to the tire when it is displaced vertically. Preferably, curved fenders are provided that conform with a substantial portion of a tire's contour to prevent vertical disengagement. In one embodiment of the present invention, the fenders are hingedly interconnected to the main body of the chock and are capable of folding into the chock body when not in use to facilitate storage. These embodiments of the invention generally do not compromise the integrity of the landing gear or other wheel attachment mechanisms or tires which is desirable since it decreases the probability of damage.

It is another aspect of the present invention to provide a chock that is adapted to interconnect to an aircraft employing multi-wheel landing gear. Some aircraft employ landing gear comprising a strut assembly with a plurality of wheels interconnected in close proximity. One embodiment of the present invention is adapted to immobilize at least one of the plurality of wheels, thereby preventing movement or theft of the aircraft.

It is yet another aspect of the present invention to provide a chock that is capable of frictional or separable interconnection with a parking surface in order to mitigate vehicle motion. In one embodiment of the present invention, the bottom surface of the chock is equipped with a non-skid material. Preferably, rubber soles or abrasive material, as sometimes used on stairways, may be interconnected to the bottom surface of a chock to create a friction-based bond with the parking area. An embodiment with fenders, as described above, may also employ small deformable protrusions that are adapted to interface between the tire and the parking surface, thereby more securably restraining the wheel and providing added impedance to movement. Alternatively, the chock may be constructed with apertures which are capable of receiving ground tie-down means or spikes. Further, one embodiment of the present invention includes a stationary portion of the chock that is interconnected to the parking area, wherein another, mobile portion, is capable of selective interconnection to the stationary portion when a wheel is in place, thereby completely immobilizing the vehicle.

It is still yet another aspect of the present invention to provide an apparatus that is adapted to be employed on other vehicles besides aircraft. Although the foregoing has mostly been concerned locking chocks capable of being used with aircraft, one skilled in the art will appreciate that other vehicles may employ the present invention. Trucks may more easily be used as terrorist tools than aircraft. Thus, it is imperative that ground vehicles are also secured against such a threat. Also, when being ferried on an ocean going vessel, across undulating waters, it is desirable to chock the wheels of any type of motor vehicle to prevent motion. Thus, the employment of a chock that secures an automobile during any kind of transport is a benefit.

Further, it is another aspect of the present invention to provide a wheel locking device for use in conjunction with aircraft ground support equipment. There are many types of ground support equipment generally used in or around aircrafts that include, but are not limited to, aircraft tugs, baggage tugs, fuel trucks, aircraft stairs, food trucks, and maintenance vehicles (hereinafter "ground support equipment"). It is important to ensure that ground support equipment cannot be moved when it is not in use since they can be used as a tool for terrorists or vandals, or be the subject of theft. More specifically, vehicles such as fuel trucks may be used as explosive devices to damage the airport or aircraft and/or injure individuals at a busy airport. Alternatively, any type of vehicle could be used as a weapon to engage an aircraft on the runaway during take off or landing. In addition, ground support equipment often carry valuables of the passengers, such as their luggage, that can be easily stolen. Thus, it is important to provide devices that ensure that the ground support equipment is not improperly moved. In order to alleviate these concerns, mobilization devices may be used with ground support equipment to ensure that they are locked at all times.

It is another aspect of the present invention to provide a wheel locking mechanism or device that includes a two piece chock system wherein one piece is situated in front of a vehicle tire while the other is situated behind the tire as described above. Again, the two pieces are designed for simplistic attachment, wherein the front and rear chocks each include a channel for interconnection. The portion of the interconnected wheel chocks which is situated inside the tire, adjacent to the axle of the vehicle, are interconnected to its mating half. This feature allows for easy interconnection of the wheel chocks while preventing the interconnected chock system from being removed when it is pulled axially in the direction of the axle. This embodiment of the present invention also includes sloped tire engagement surfaces, or ramps, that selectively engage the tires to ensure that they are removable when the system is interconnected. One skilled in the art will appreciate that a locking device with interconnection to a ground support equipment can include all of the aspects described above without departing from the scope of the invention.

It is yet another aspect of the present invention to provide an auxiliary locking device for interconnection with a locking device for a ground support equipment. More specifically, a hook and stanchion system is used for interconnection with the interconnected wheel chock system. The stanchion is generally the height of the tire, wherein the hook will reside above. Thus, the locking device cannot be removed from the tire when the vehicle is either lifted or jacked up out of the chock. More specifically, the chock will remain interconnected to the wheel, similar to that described above wherein a chain was employed with an aircraft landing gear. The auxiliary locking system uses an adjustable interface which allows it to be able to accommodate varying sizes of tires. In addition, a wheel cover may be integrated on to the stanchion such that when it is employed, the lug nuts which interconnect the tire to the axle are covered, thus preventing the removal of said nuts to remove the entire wheel with the lock system engaged therewith.

Thus, it is one aspect of the present invention to provide a vehicle immobilization apparatus comprising a forward chock comprising a left channel, a right channel, and a tire contact surface, interconnected to said left channel and said right channel; a rear chock comprising a left channel, a right channel, and a tire contact surface, interconnected to said left channel and said right channel wherein a tire of the vehicle is substantially immobilized when said left channel of said forward chock is interconnected to said left channel of said rear chock, said right channel of said forward chock and said right channel of said rear chock are situated adjacent to an inner surface of a tire, and said tire contact surface of said forward chock and said tire contact surface of said rear chock are engaged on the tire and a locking means interconnected to said left channel of said forward chock and said left channel of said rear chock that restrains said forward chock with respect to said rear chock when they are interconnected, thus preventing removal of said apparatus.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these embodiments.

FIG. 8 is a front elevation view of another embodiment of the present invention, wherein a single telescoping "C" channel is employed to selectively interconnect the chock halves; and wherein a locking means is omitted for clarity;

FIG. 9 is a right elevation view of the embodiment of the present invention shown in FIG. 8;

FIG. 13 is a top plan view of a first chock half of an alternate embodiment of the present invention;

FIG. 14 is a front elevation view of the first chock half of the embodiment shown in FIG. 13;

FIG. 15 is a top plan view of a second chock half of an alternate embodiment of the present invention;

FIG. 16 is a front elevation view of the second chock half of the embodiment shown in FIG. 15;

Figure 1:
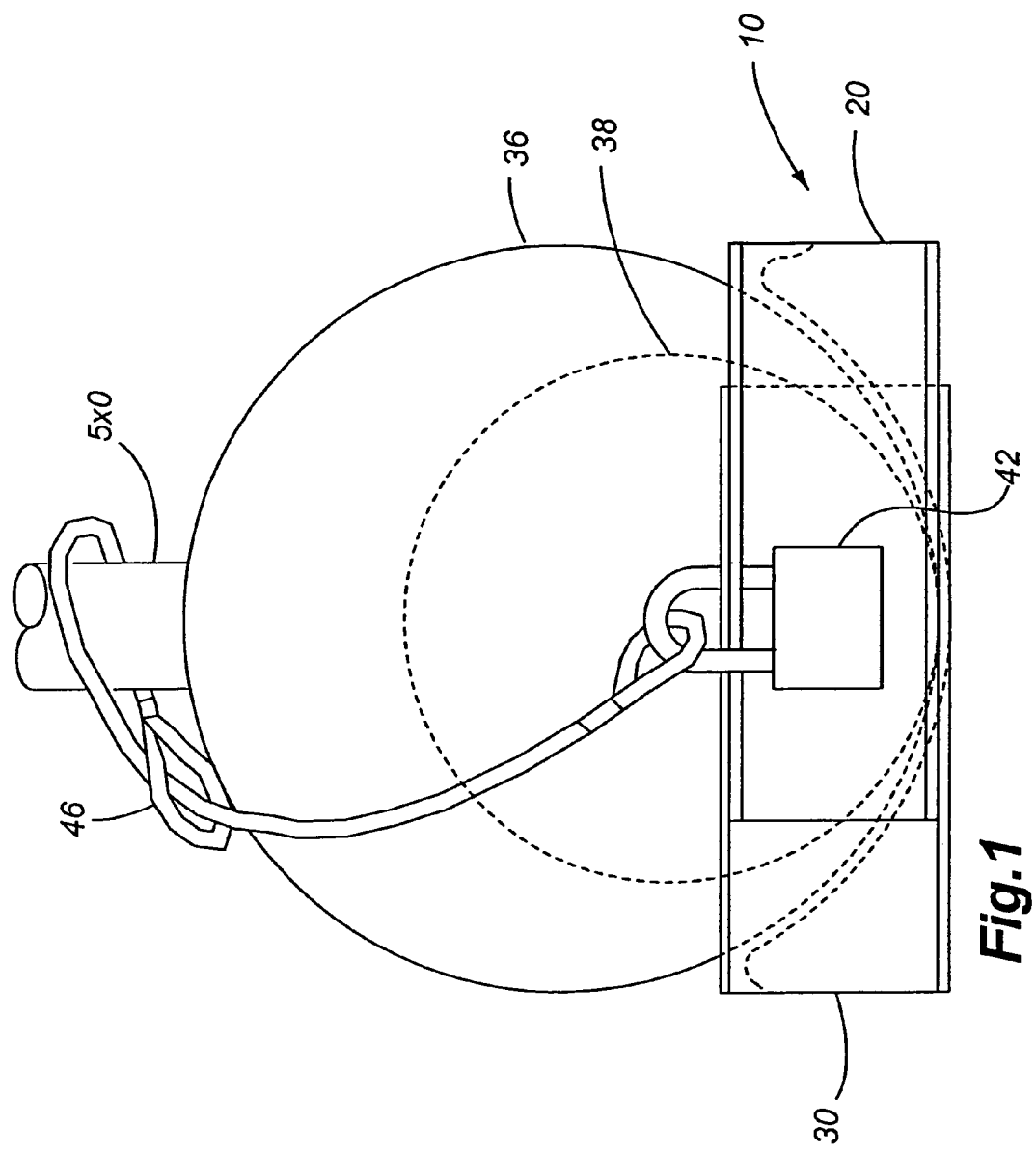
FIG. 1 is a front elevation view of one embodiment of the present invention, wherein only one side of the selectively interconnecting chock halves are locked and chained.
Figure 2:
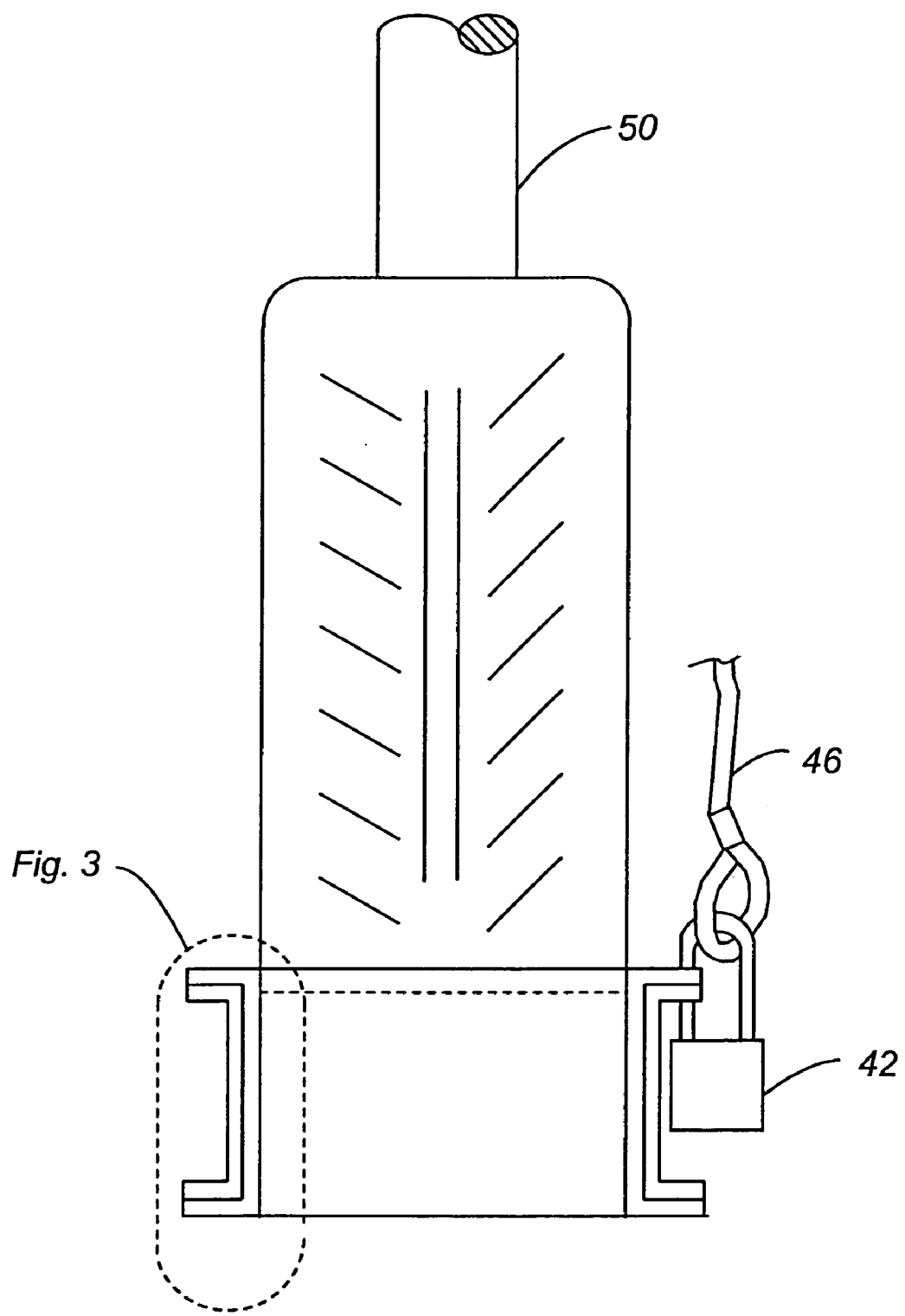
FIG. 2 is a left elevation view of the embodiment of the present invention shown in FIG. 1.
Figure 3:
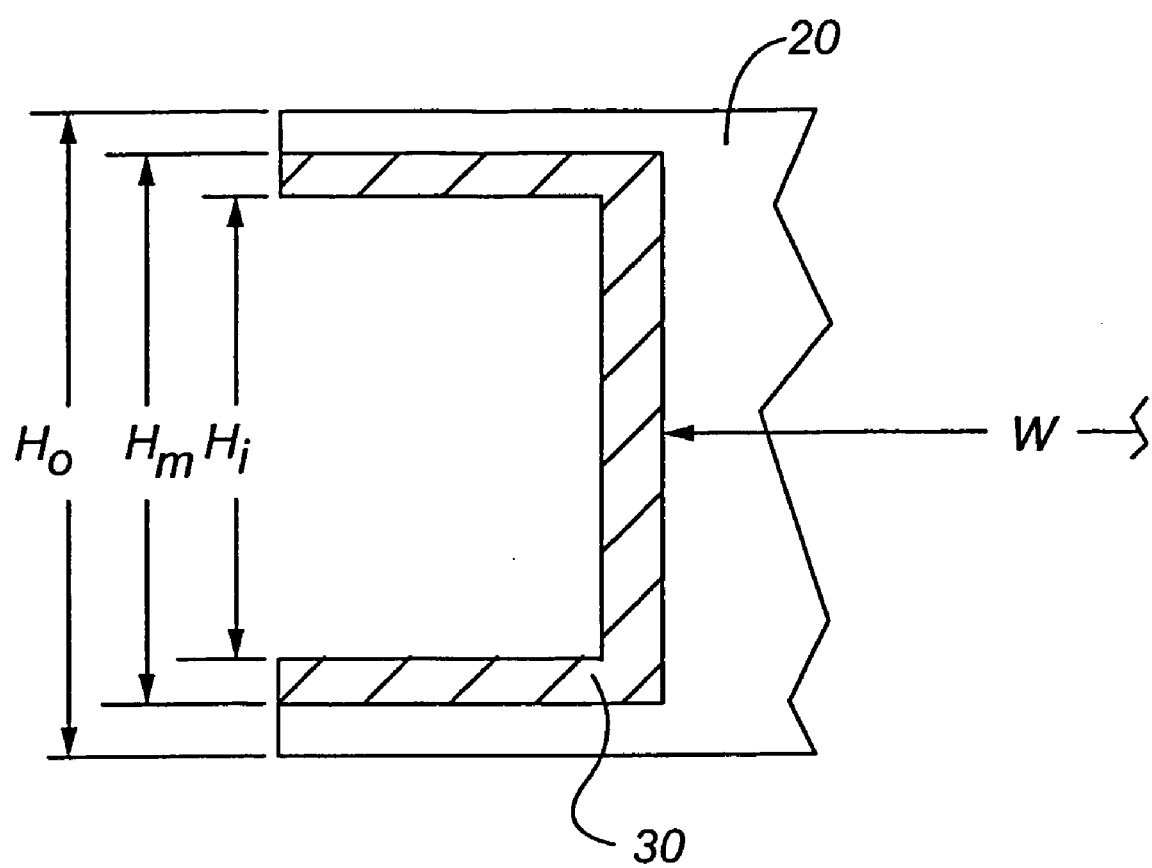
FIG. 3 is a detail view of the embodiment of the present invention shown in FIG. 2; wherein the interconnected chocks are shown.
Figure 6:
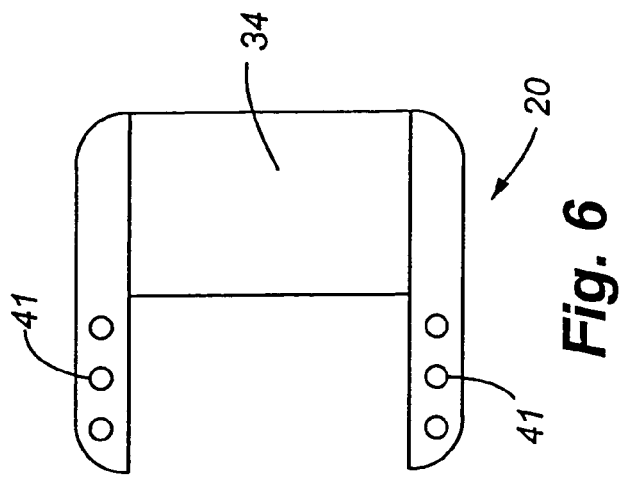
FIG. 6 is a top plan view of a second chock half of the present invention shown in FIG. 1.
Figure 7:
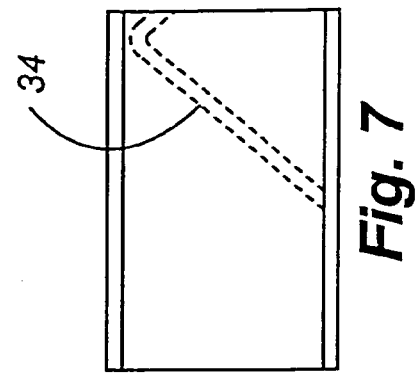
FIG. 7 is a front elevation view of the second chock half of the present invention shown in FIG. 6.
Figure 4:
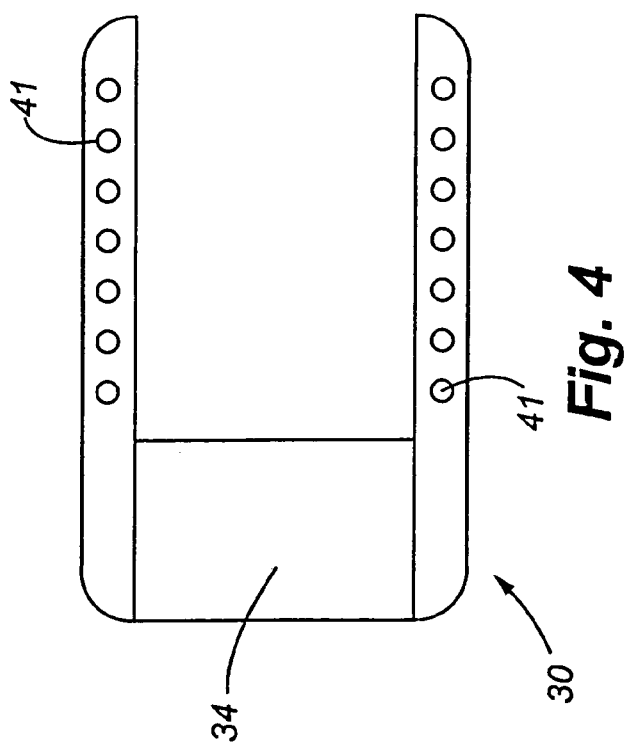
FIG. 4 is a top plan view of a first chock half of the present invention shown in FIG. 1.
Figure 5:
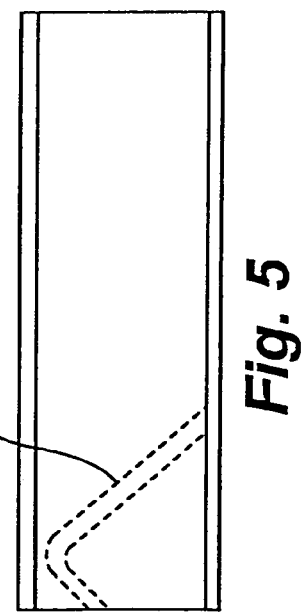
FIG. 5 is a front elevation view of the first chock half of the present invention shown in FIG. 4.

It should be understood that the drawings are not necessarily to scale. In certain instances, details which are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| # | Component |
|---|---|
| 10 | Locking Chock |
| 20 | Forward Chock |
| 30 | Rear Chock |
| 34 | Ramp |
| 35 | Inverted Ramp |
| 36 | Large Diameter Tire |
| 38 | Small Diameter Tire |
| 40 | Wheel hub |
| 41 | Channel apertures |
| 42 | Lock |
| 46 | Chain |
| 50 | Strut |
| 55 | Side locking "C" Channel |
| 57 | Plate |
| 60 | Vertical extensions |
| 64 | Handle |
| 66 | Fender |
| 67 | Rod |
| 68 | Back rest |
| 74 | Axle |
| 76 | Inner portion |
| 78 | Hand hold |
| 80 | Wall |
| 81 | Auxiliary locking device |
| 82 | Tire hook |
| 84 | Stanchion |
| 86 | Bracket |
| 88 | Aperture |
| 90 | Threaded rod |
| 92 | Locking member |

DETAILED DESCRIPTION

Referring now to FIGS. 1 through 21, a locking chock of the present invention is shown. More specifically, a wheel immobilization device 10 that is commonly employed on aircraft, is shown that consists of at least a forward chock 20, a rear chock 30, a lock 42, and a flexible securing mechanism, such as a chain 46. Once the aircraft is parked, a pilot or airport ground personnel, slide the forward chock 20 of the chock in front of a tire 36 on the aircraft. Next, the rear chock 30 is slid behind the tire 36 and selectively interconnected to the forward chock 20.

Referring now to FIGS. 1 through 7, one embodiment of the present invention is shown. More specifically, a locking chock 10 that includes a forward chock 20 and a rear chock 30 that selectively interconnect are shown. Preferably, the half chocks 20 and 30 each include two opposing "C" channels interconnected by a ramp 34 that is adapted for engagement with an aircraft tire 36. The ramp 34 fits the contour of the tire 36 thereby preventing rolling. In addition, the ramp 34 is designed to fit different sized tires to prohibit movement. For example, a ramp 34 may be fashioned to restrain a 17 inch diameter tire 36 or a 13 inch diameter tire 38 that yields sufficient immobility in both situations. Furthermore, the ramp 34 is approximately the same width W as the tire to which it is used. However, one skilled in the art will appreciate that the ramp 34 may be made adjustable in order to accommodate a plurality of tire widths. For example, the ramp may be made of at least two halves that are operably interconnected and thus adjustable.

Referring now to FIGS. 3–7, the "C" channels (hereinafter "channels") of the locking chock is further described. The channels are designed to selectively interconnect by a telescoping connection. In one embodiment, the forward chock 20 has an overall height of $H_o$ that does not interfere with an aircraft's wheel hub 40 or any protruding aircraft mechanisms. The forward chock 20 has a inner-channel height of $H_m$, which is substantially the same as the rear channel's 30 overall height. Therefore, the channel employed on one chock half is capable of a sliding, telescoping, interconnection with the channel of the other chock half. The channels are also equipped with a plurality of apertures 41 and/or slots that are adapted to receive a lock 42. The forward 20 and rear 30 chocks of the locking chock 10 may be constructed from any rigid material, preferably aluminum, stainless steel, or a graphite composite.

Referring now to FIGS. 8 and 9, another embodiment of the present invention is shown. This embodiment preferably employs a forward chock 20 and a rear chock 30. Each of the chocks 20 & 30 generally include triangularly shaped chocks that are also equipped with at least one "C" channel 55. The channels 55 are designed to selectively interconnect when the forward 20 and the rear 30 chock halves are selectively interconnected. A plate 57 interconnected to at least one chock will prevent a would-be thief from removing the apparatus by simply sliding the chock 10 transverse to the tire. Preferably, a chain 46 is interconnected to the plate 57 side of the chock 10 that is adapted to wrap around an aircraft strut 50 and interfacing with a lock 42 that is selectively interconnected to apertures in the locking channels 55.

Figure 10:
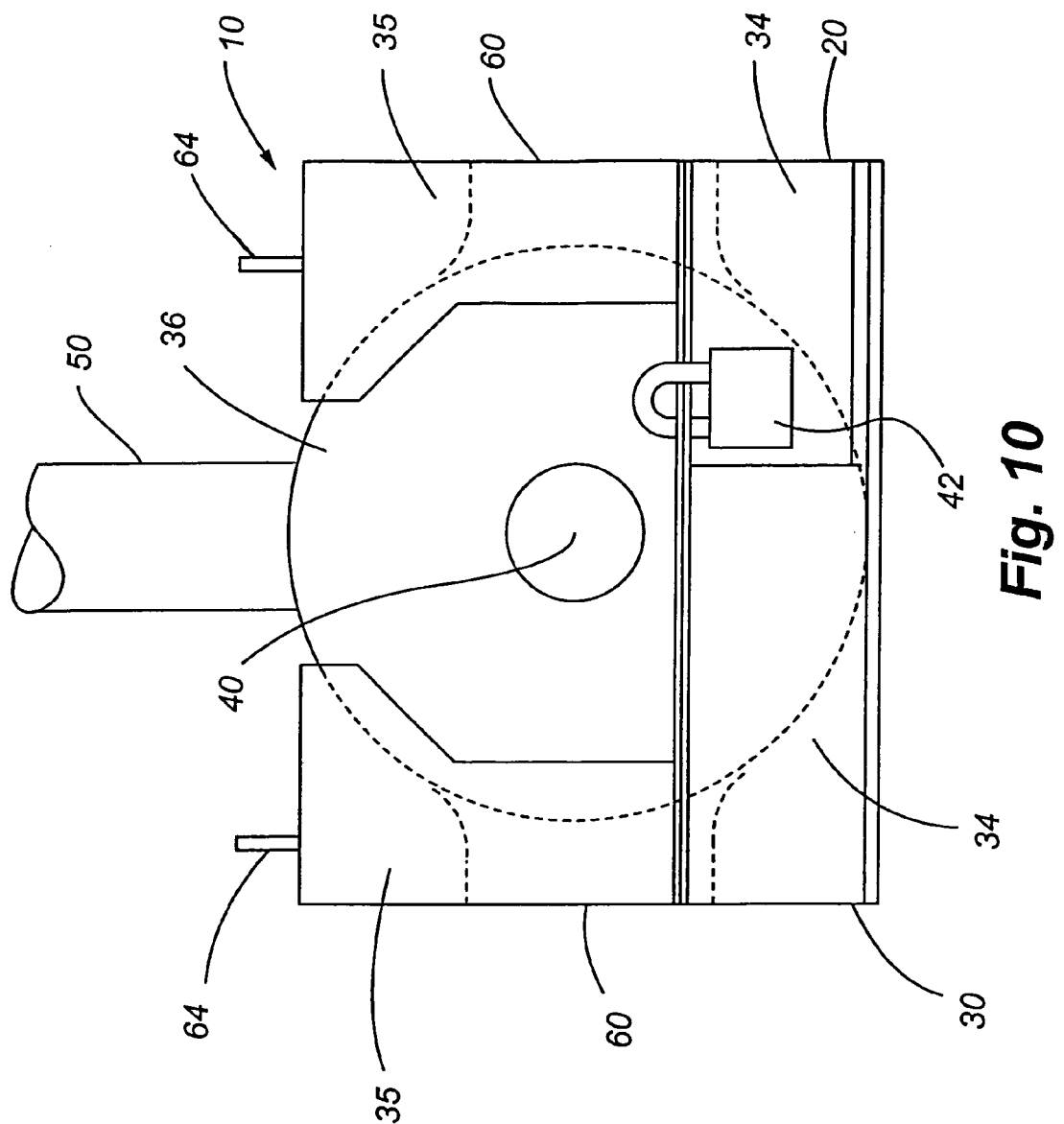
FIG. 10 is a front elevation view of yet another embodiment of the present invention, wherein the chock halves incorporate vertical extensions and thus are not necessarily required to use tethering means.

Referring now to FIG. 10, yet another embodiment of the present invention is shown, wherein the chock 10 is used without a chain. The aforementioned chocks are preferably used in conjunction with a chain or other flexible securing means. However, it is often undesirable to use chains around aircraft. For example, most smaller planes employ exposed brakes and shocks that may be damaged if impacted by chains as the chock 10 is engaged and removed. One way to ensure aircraft security and prevent adverse effects of chains is to add vertical extensions 60 onto the forward 20 and rear 30 chocks. In one embodiment, the vertical extensions 60 employ inverted ramps 35 that abut against the tire 36 to prevent one from lifting the tire 36 out of a locked chock 10. To accommodate larger diameter tires, the extensions 60 may incorporate an adjustment means, such as a telescoping mechanism. In addition, the forward 20 and rear 30 chock halves, in one embodiment, are equipped with handles 64 to aid in installation and removal of the apparatus. Finally, one skilled in the art will appreciate that an additional "C" channel may be added near the top of this embodiment to further secure the apparatus. Alternatively, a chain may be added to interconnect the upper halves together if chain damage is not a concern.

Figure 11:
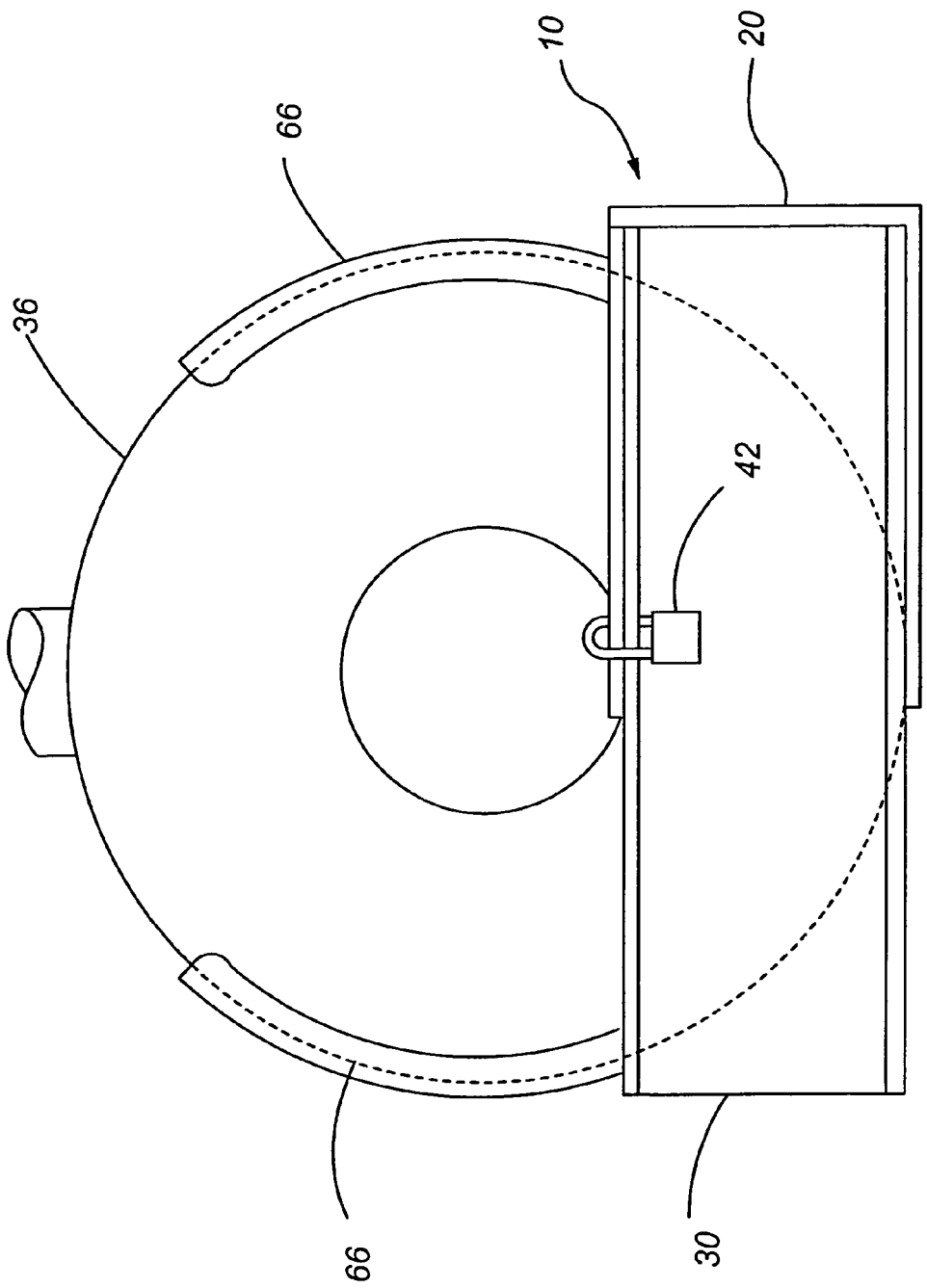
FIG. 11 is a front elevation view of still yet another embodiment of the present invention, wherein the chock halves incorporate fenders, and thus are not necessarily required to use tethering means.
Figure 12:
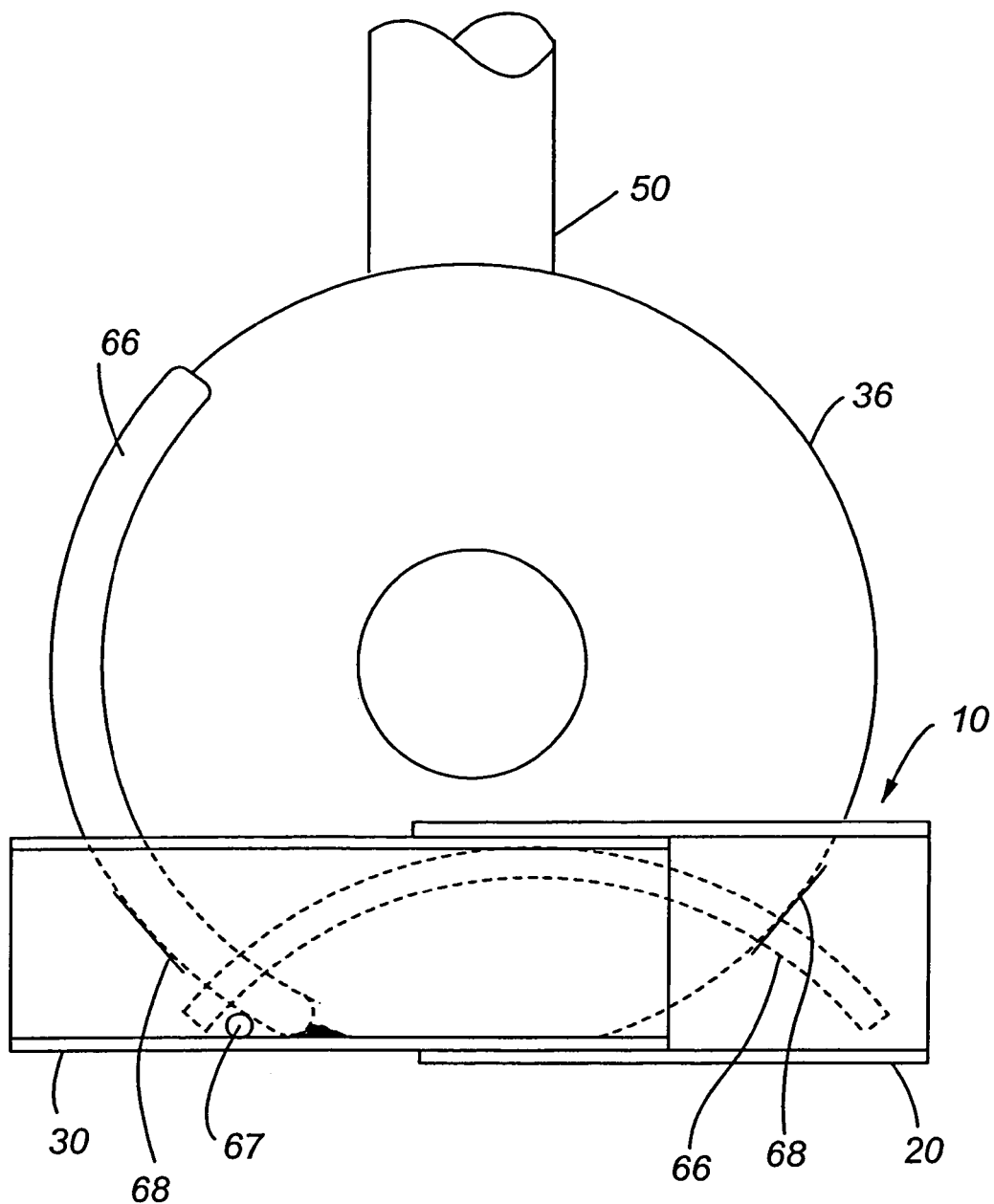
FIG. 12 is a front elevation of another embodiment of the present invention, wherein the chock halves incorporate fenders that capable of rotation in order to facilitate storage, and wherein one fender and the locking means are omitted for clarity.

Referring now to FIGS. 11–12, still yet another embodiment of the present invention is shown. Similar to the embodiment described in FIG. 10, this embodiment does not require a tethering means, such as a chain. The chock 10 employs fenders 66 interconnected to the forward 20 and the rear 30 chock halves. The fenders 66 are capable of fitting around a substantial portion of the tire 36, thereby preventing disengagement by simply lifting the tire 36 out of the chock 10. In addition, the fenders 66 may be equipped with side walls 68 that prevent a would-be thief from tipping the chock 10 on it's side and slipping the tire 36 out from the top portion of the chock 10 and the fenders 66. Alternatively, a chain may be added to tether the chock 10 to the aircraft 50 if chain damage is not a concern or if the aircraft 50 employs wheel covers. In another similar embodiment, the forward 20 and the rear 30 chock halves are equipped with handles or other transportation aids to facilitate installation and removal of the apparatus. In still yet another related embodiment, the fenders 66 are capable of selective interconnection to the chock halves 20 & 30. Removable fenders 66 will facilitate transportation and installation. In addition, one skilled in the art will appreciate that fenders 66, either fixed or detachable, may easily be adapted to be used with a plurality of tire 36 diameters.

Referring now to FIG. 12, another embodiment of the present invention equipped with foldable fenders 66 to facilitate storage is shown herein. In order to decrease the vertical profile of the chock 10 the fenders 66 may be hingedly interconnected to the chock halves 20 & 30. Preferably, the fenders 66 are interconnected to a rod 67 that span between the channels of the respective chock halves 20 & 30. To deploy for use, the fenders 66 are rotated around the rods 67 until they contact back rests 68 that are interconnected to the chock halves 20 & 30 between the respective channels. When not in use, the fenders 66 may be folded down within their respective chocks to decease the vertical profile of the entire assembly. The folded chock 10 will thus be adapted to more easily fit into a storage case or bag.

As mentioned above, some aircraft require a plurality of tires 36, connected via an axle 74, in order to accommodate larger payloads. One embodiment of the present invention employs a chock 10 equipped with a shortened channel that provides sufficient clearance from the axle 74. Alternatively, a chock 10 may be constructed that is adapted to encompass the plurality of tires 36.

Referring now to FIGS. 13–21, another embodiment of the present invention is shown that is adapted for interconnection with aircraft ground support equipment. This embodiment is similar to that shown and described above, however, the inner portions 76 of the locking chock 10 are shortened such that they do not engage each other. This feature is important since brakes and axles of the vehicle must be accommodated. In addition, this space integrated into the system, allows the chocks to be easily engaged onto the tire, while preventing transverse movement (i.e. movement parallel to axis of the axle) after interconnection.

Referring now to FIGS. 13–16, the chock halves of this embodiment of the locking chock are further described. As shown, the channels are designed to selectively interconnect by a telescoping interconnection, similar to that shown above in FIGS. 3–7. However, in this embodiment of the present invention, the portions of the channel 76 that are placed adjacent to the inner surface of the tire are incomplete such that a space is provided to clear the brakes, axles and other obstructions generally found on ground support equipment. The channels are also equipped with a plurality of apertures 41 and or slots that are adapted to receive a lock.

The forward 20 and rear 30 chocks of the locking chock may be constructed from any rigid material, preferably aluminum, stainless steel or a graphite composite. Although channels are shown that engage the inner surface of the tire to prevent transverse movement of the interconnected chock halves, one skilled in the art will appreciate that other methods can be used. More specifically, plates, beams, rods, or other rigid members that are interconnected to each chock half to prevent transverse motion of the interconnected chocks may be employed without departing from the scope of the invention.

Figure 17:
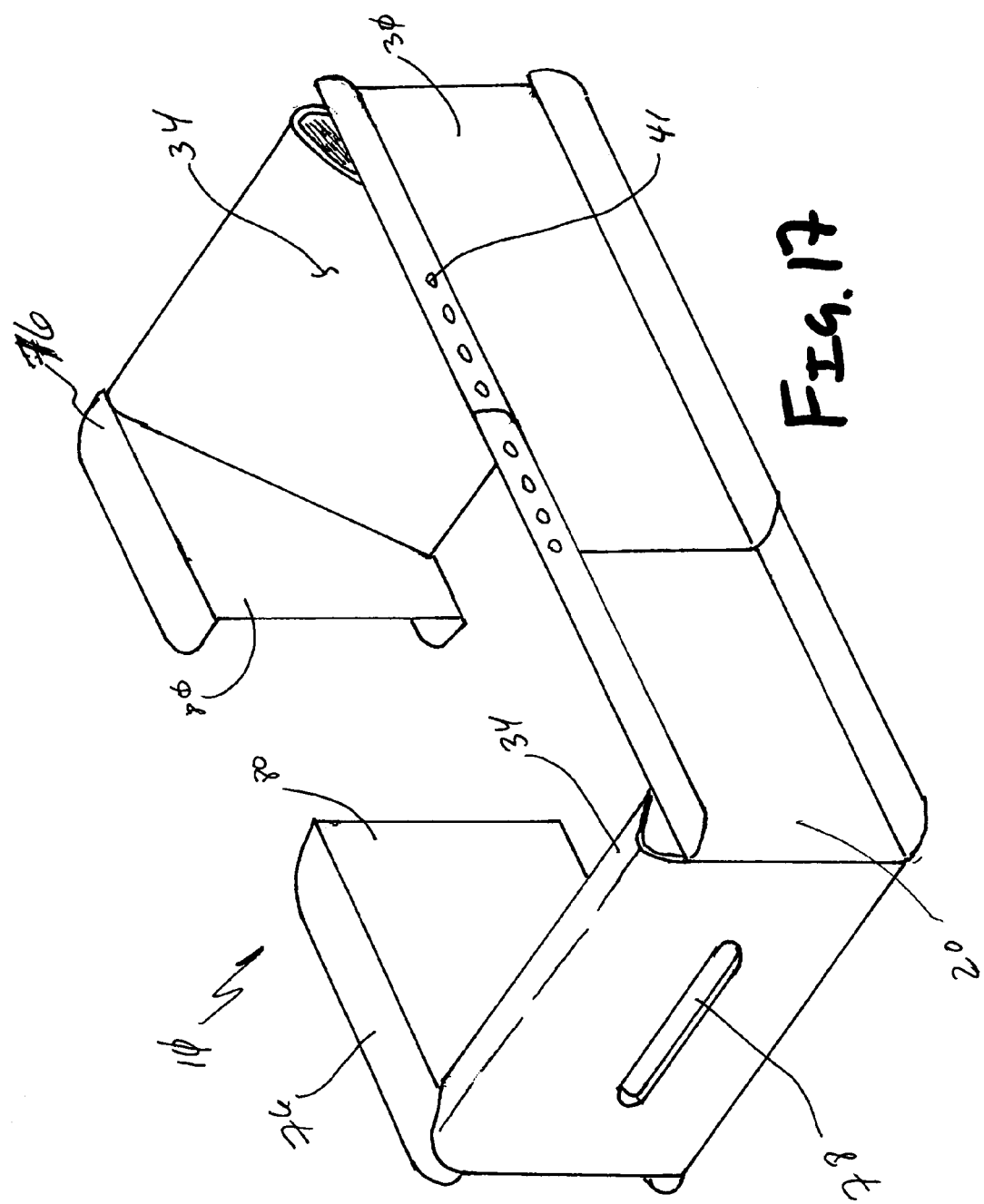
FIG. 17 is a perspective view of an alternate embodiment of the present invention showing the first clock half interconnected to the second chock half.

Referring now to FIG. 17, a perspective view of the locking chock 10 is shown. Here, the locking chock 10 is shown that includes two ramps 34 for engaging the tire. The locking chock 10 may also include at least one hand hold 78 integrated therein such that the system may be easily transported from the ground support vehicle to the ground, for example. The forward chock 20 and rear chock 30 interconnect in a sliding, telescoping manner, wherein apertures 41 included in both halves are aligned to accommodate a lock. The incomplete channel of the locking chock 10 is provided with walls 80 that are placed adjacent to the inner portion of the tire to further prevent the locking chock from being removed.

Figure 18:
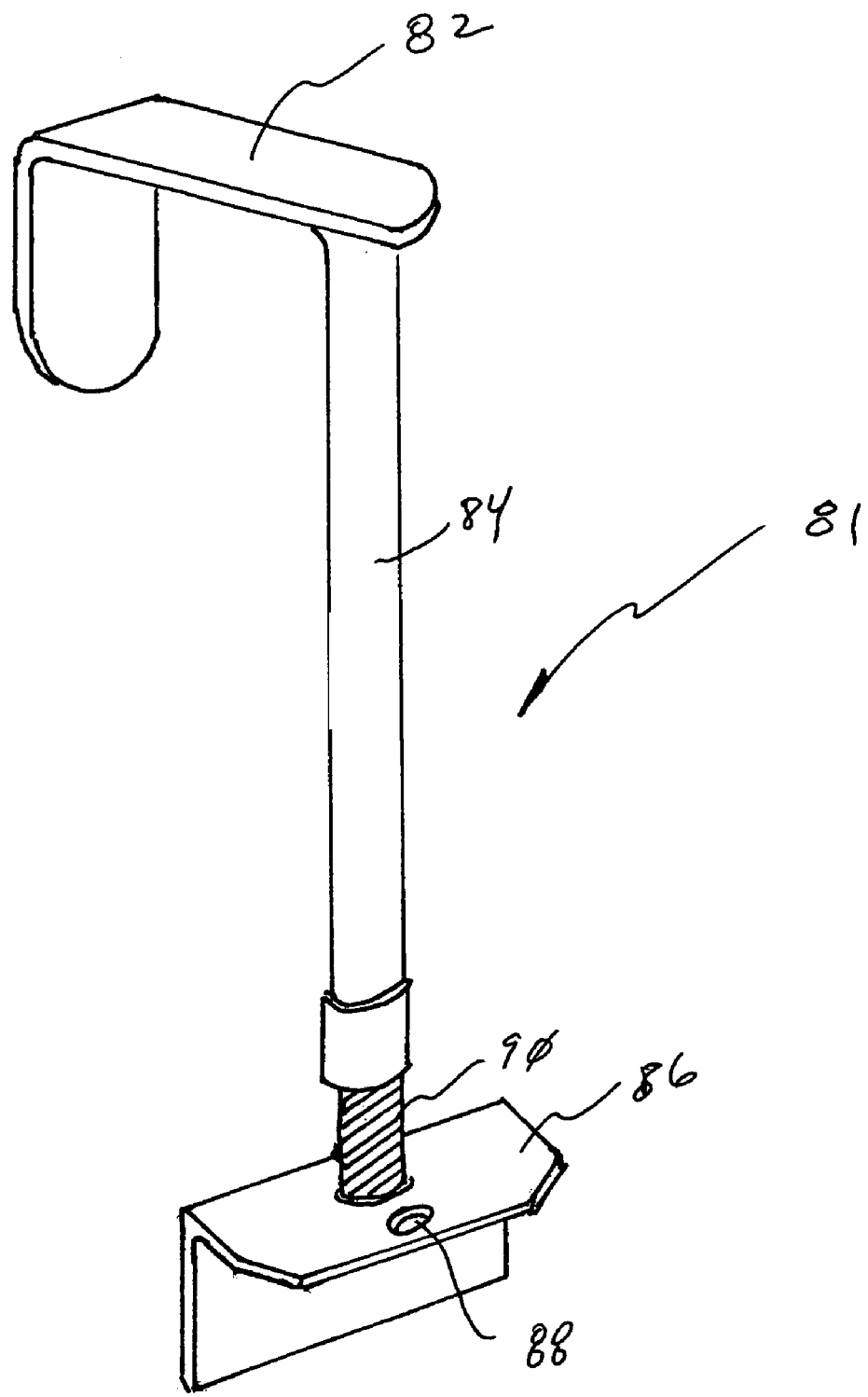
FIG. 18 is a perspective view of a tire hook for interconnection with the embodiment shown in FIG. 17.
Figure 19:
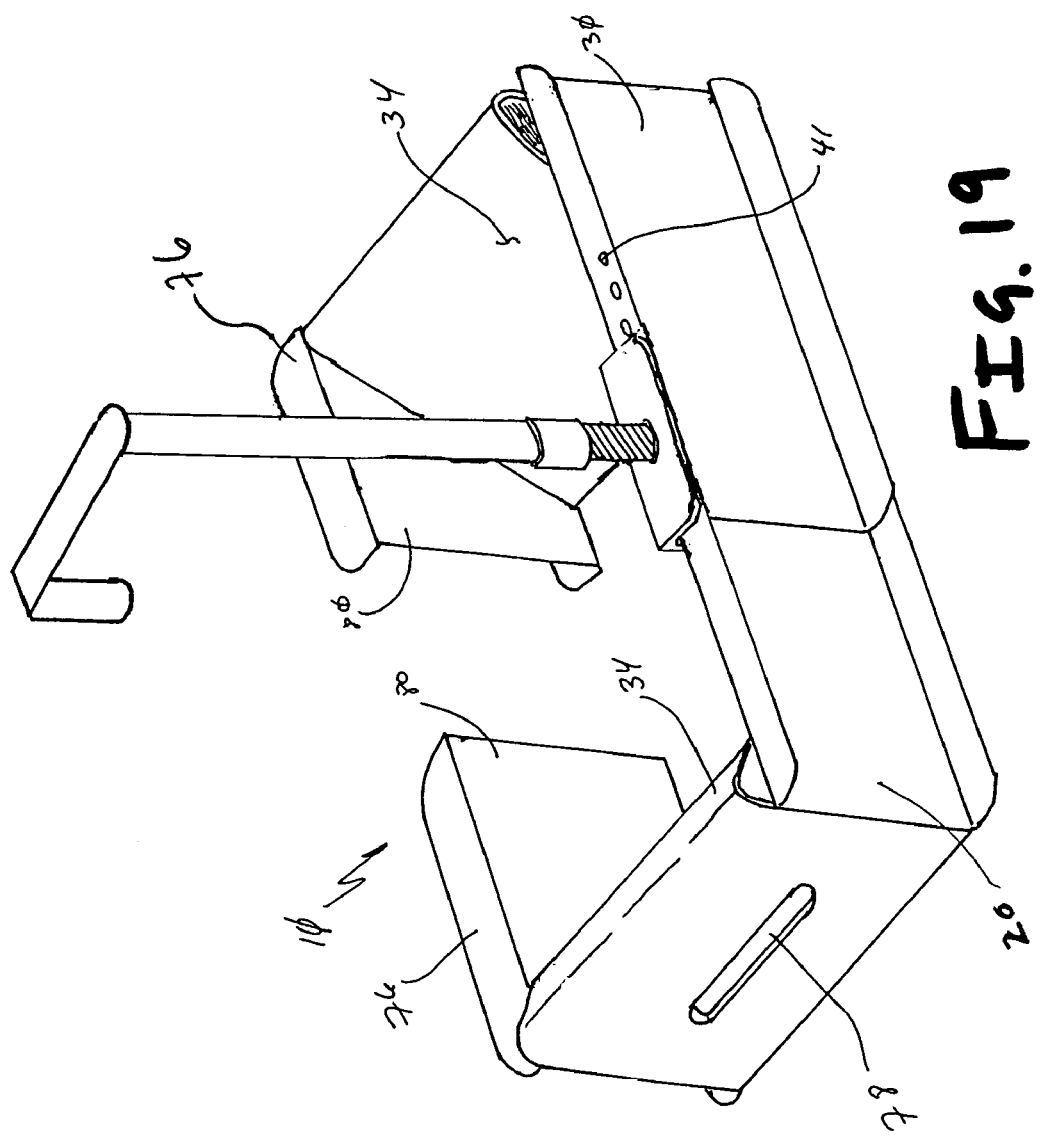
FIG. 19 is a perspective view of the hook shown in FIG. 18 interconnected to the interconnected clock halves shown in FIG. 17.
Figure 20:
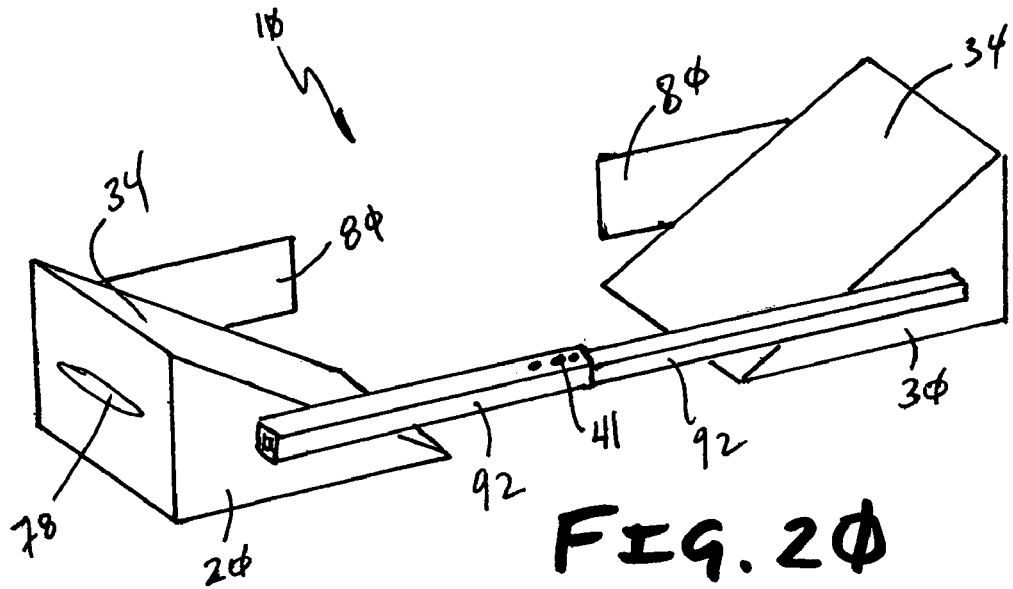
FIG. 20 is a perspective view of an alternate embodiment of the present invention.
Figure 21:
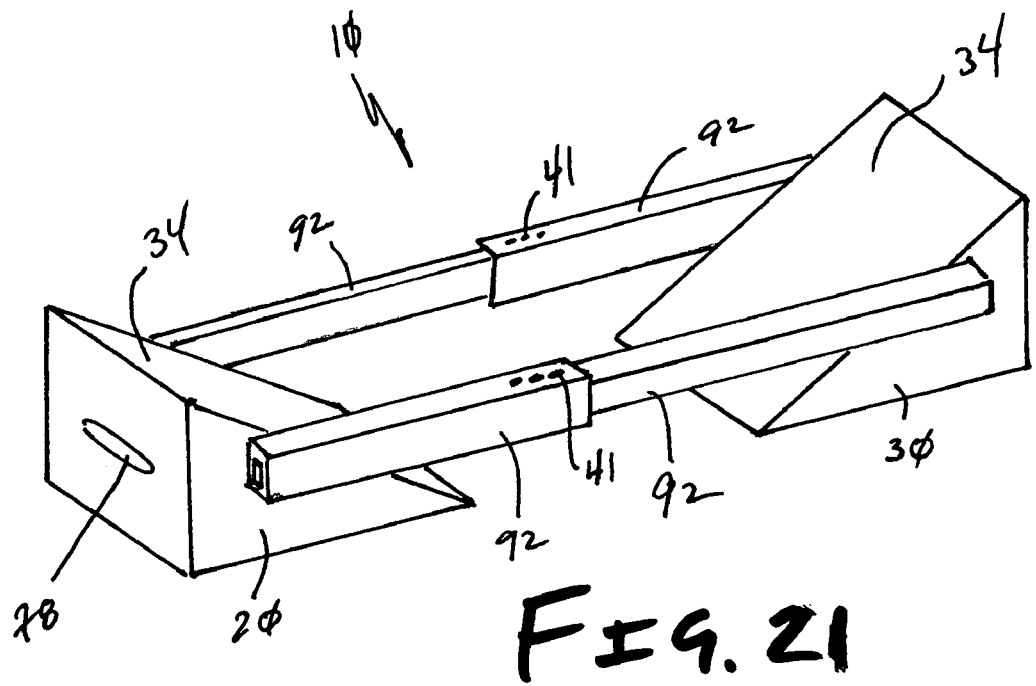
FIG. 21 is a perspective view of an alternate embodiment of the present invention similar to that shown in FIG. 20.

Referring now to FIGS. 18 and 19 an auxiliary locking device 81 for interconnection to the locked chock is shown. More specifically, this component includes a hook 82 interconnected to a stanchion 84 that is in turn interconnected to a bracket 86. The bracket 86 includes at least one aperture 88 for alignment with the apertures of the forward and rear chock halves. The lock is placed through the aligned apertures to ensure that the system remains in place. The hook 82 is designed to engage an upper portion of the tire to prevent removal of the chock when the vehicle tire is moved in an upward direction relative to the stationary locked chock. The hook 82 is interconnected to a stanchion, which is simply a cylindrical tube, that may be interconnected to a threaded member 90 such that the height of the hook 82 may be selectively altered to accommodate various tire diameters.

Referring again to FIGS. 1–21, the installation procedure of the locking chock 10 is described herein. Once an aircraft, or other wheeled vehicle is in the desired parking location, the forward chock 20 is wedged between the tire 36 of the aircraft and the parking surface. Next, the rear portion 30 is wedged behind the tire 36 and selectively interconnected with the forward chock 20. Although, as described herein, the rear chock 30 slides into the forward chock 20, one skilled in the art will appreciate that due to the symmetry of the chocks 20 and 30, the "forward" and "rear" portions may be interchanged. The extent of the telescoping interconnection between the forward 20 and the rear 30 chocks will be dictated by the diameter of the tire 36. Apertures 41 in the chock portions 20 & 30 are then aligned. Finally a lock 42 is used to securely interconnect the two portions 20 & 30 via the apertures 41. The chocks 20 & 30 may be equipped with at least two aperture patterns so that two locks are used for added security. In addition, one skilled in the art will appreciate that a locking mechanism may be integrated into the chock, which would prevent lock misplacement. Moreover, an integrated lock may be protected from theft attempts or damage within a portion of the chock. For example, automobile immobilization means such as the Denver Boot isolate and protect the locking means to prevent damage from disgruntled car owners.

In one embodiment, a plastic encased chain 46 is used to tie the lock to the aircraft, or other vehicle, to prevent forceful disengagements of the locking chock 10 by lifting the tire out of the chock 10. By adding a flexible securing means, the chock 10 will still be interconnected to the aircraft after the tire is lifted from the chock. Thus, vehicle movement would be difficult or impossible while dragging the still-attached chock 10. In a related embodiment of the invention, the flexible securing means includes at least two flexible straps or cables that are adapted to selectively interconnect to the landing gear of the aircraft. The straps also employ a plurality of apertures that are designed for selective locking interconnection to attachment locations on the chock, thereby providing a snug fit between the chock and the tire. The straps are preferably constructed of vulcanized rubber, or alternatively employ stiffening members, such as steel belts that make them difficult to cut.

One embodiment of the present invention may include an adjustable auxiliary locking device 81 for interconnection to the upper portion of the tire. This embodiment of the present invention is used generally with ground support equipment and prevents the removal of the tire simply by my lifting it out of the locking chock 10. In operation, one would assess the length needed for the hook 82 to clear the upper portion of the tire. The height would be then selectively adjusted by way of a threaded interface 90. Once the locking halves are engaged onto the tire, the bracket 86 that is interconnected to the adjustable stanchion 84 would be locked onto the chocks, thereby locking the whole system around the tire. As shown herein, an adjustable stanchion 84 is shown, however one skilled in the art will appreciate that a fixed system may be used with departing from the scope of the invention.

Removal of a locking chock 10 would simply entail disengagement of the lock 42, removal of the chain 46, or arm and separation of the forward 20 and the rear 30 chocks. The chock 10 is easily stowed in the aircraft, or alternatively left in a designated area at the airport for others to use.

While various embodiment of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A vehicle immobilization apparatus, comprising:
    a forward chock comprising a left channel, a right channel, and a tire contact surface interconnected to said left channel and said right channel;
    a rear chock comprising a left channel, a right channel, and a tire contact surface interconnected to said left channel and said right channel;
    wherein a tire of the vehicle is substantially immobilized when said left channel of said forward chock is interconnected to said left channel of said rear chock and said right channel of said forward chock and said right channel of said rear chock are situated adjacent to an inner surface of a tire, wherein said tire contact surface of said forward chock and said tire contact surface of said rear chock are substantially engaged on the tire; and
    a locking means interconnecting said left channel of said forward chock and said left channel of said rear chock wherein said forward chock and said rear chock are substantially prevented from disengagement from the tire.

2. The vehicle immobilization apparatus of claim 1, wherein said locking means is an aperture incorporated into said left channel of said forward chock and said left channel of said rear chock that is adapted to receive a locking mechanism.

3. The vehicle immobilization apparatus of claim 1, further comprising vertical end surfaces interconnected between said left channel and said right channel of said forward chock and said left channel and said right channel of said rear chock, said vertical surfaces being interconnected adjacent to an upper edge of said tire contact surface, and wherein said vertical end surfaces including at least one hand hold.

4. The vehicle immobilization apparatus of claim 1 further comprising a tire clamp, said tire clamp comprising a hook for engagement with an upper surface of the tire, a bracket for interconnection with said vehicle immobilization apparatus, and a selectively adjustable member therebetween, wherein said vehicle immobilization device will remain engaged on the tire when the tire is moved perpendicular to the surface on which the vehicle rests.

5. The vehicle immobilization apparatus of claim 4, further comprising an aperture integrated into said bracket for alignment with a corresponding aperture on said left channel of said front chock and said rear chock, thereby providing a location for the interconnection of a locking device.

6. A vehicle immobilization apparatus, comprising:
    a forward chock comprising an exterior member, an interior member and a forward tire contact surface interconnected thereto, said interior member being shorter than said exterior member;
    a rear chock comprising an exterior member, an interior member and a rear tire contact surface interconnected thereto, said interior member being shorter than said exterior member;
    wherein a tire of the vehicle is substantially immobilized when said exterior member of said forward chock is selectively interconnected to said exterior member of said rear chock, said forward tire contact surface and said rear tire contact surface are engaged on the tire, and said interior member of said forward chock and said interior member of said rear chock is placed adjacent to the inner surface of the tire to substantially prevent transverse removal of the interconnected chocks; and
    a locking means operably interconnecting said exterior member of said forward chock to said exterior member of said rear chock, which substantially prevents removal of said apparatus from the tire.

7. The vehicle immobilization apparatus of claim 6, wherein said locking means comprises apertures incorporated into said exterior member of said forward chock and into said exterior member of said rear chock that are adapted to receive a locking mechanism.

8. The vehicle immobilization apparatus of claim 6, further comprising vertical end surfaces interconnected between said exterior member and said interior member of said forward chock and said exterior member and said interior member of said rear chock, said vertical end surfaces including at least one hand hold.

9. The vehicle immobilization apparatus of claim 6, further comprising a tire clamp, said tire clamp including a hook for engagement with an upper surface of the tire, a bracket for interconnection with said vehicle immobilization apparatus, and a selective adjustable member positioned therebetween.

10. The vehicle immobilization apparatus of claim 9, further comprising an aperture integrated into said bracket for alignment with corresponding aperture on said external members of said front chock and said rear chock, thereby providing a location for the interconnection of a locking mechanism.

11. The vehicle immobilization apparatus of claim 10, wherein said locking mechanism comprises at least one of a cable, a padlock, a cylinder lock, and a combination lock.

12. A vehicle immobilization device, comprising:
a forward chock comprising an external member, an interior member and a front panel interconnected thereto, said interior member being shorter than said external member;
a rearward chock comprising an external member, an interior member and a rear panel interconnected thereto, said interior member being shorter than said external member, and wherein said forward chock and said rearward chock are adapted for interconnection and sized to receive a vehicle tire therebetween; and
adjustment means interconnected to at least one of said forward chock and said rearward chock, wherein a distance between said front panel and said rear panel is selectively adjustable during attachment and removal of said vehicle immobilization device to a vehicle tire; and
a locking means operably interconnected to at least one of said forward chock and rearward chock, wherein said immobilization device can be selectively secured around the vehicle tire.

13. The vehicle immobilization apparatus of claim 12, wherein said locking means comprises apertures incorporated into said exterior member of said forward chock and into said exterior member of said rearward chock that are adapted to receive a locking mechanism.

14. The vehicle immobilization apparatus of claim 12, further comprising vertical end surfaces interconnected between said exterior member and said interior member of said forward chock and said exterior member and said interior member of said rearward chock, said vertical end surfaces including at least one hand hold.

15. The vehicle immobilization apparatus of claim 12, further comprising a tire clamp, said tire clamp including a hook for engagement with an upper surface of the tire, a bracket for interconnection with said vehicle immobilization apparatus, and a selective adjustable member positioned therebetween.

16. The vehicle immobilization apparatus of claim 12, further comprising an aperture integrated into said bracket for alignment with corresponding aperture on said external members of said front chock and said rearward chock, thereby providing a location for the interconnection of a locking mechanism.

17. The vehicle immobilization apparatus of claim 16, wherein said locking mechanism comprises at least one of a cable, a padlock, a cylinder lock, and a combination lock.

18. The vehicle immobilization apparatus of claim 12, wherein said adjustment means comprises said exterior member of said forward chock operably interconnected to said exterior member of said rearward chock, wherein said forward chock and said rearward chock are capable of selective displacement with respect to each other.

19. A method for immobilizing a wheel, comprising:
providing a forward chock comprising an exterior member, an interior member and a forward tire contact surface interconnected thereto, said interior member being shorter than said exterior member;
providing a rearward chock comprising an exterior member, an interior member and a rear tire contact surface interconnected thereto, said interior member being shorter than said exterior member;
placing said forward chock adjacent to a circumferential surface of the wheel, wherein said exterior member is placed adjacent to an outer surface of the wheel;
placing said rearward chock adjacent to the circumferential surface of the wheel, opposite from said forward chock, wherein said exterior member is placed adjacent to the outer surface of the wheel and in engagement with said exterior member of said forward chock;
locking said exterior member of said forward chock to said exterior member of said rearward chock to substantially prevent removal of said chocks from the tire.

20. The method of claim 19, wherein said locking includes providing a pad lock that interfaces with apertures integrated in said exterior member of said forward chock and said exterior member of said rearward chock.

* * * * *